June 30, 1931.  D. J. STEWART  1,812,668
HEAT REGULATOR
Filed Jan. 12, 1929   2 Sheets-Sheet 1
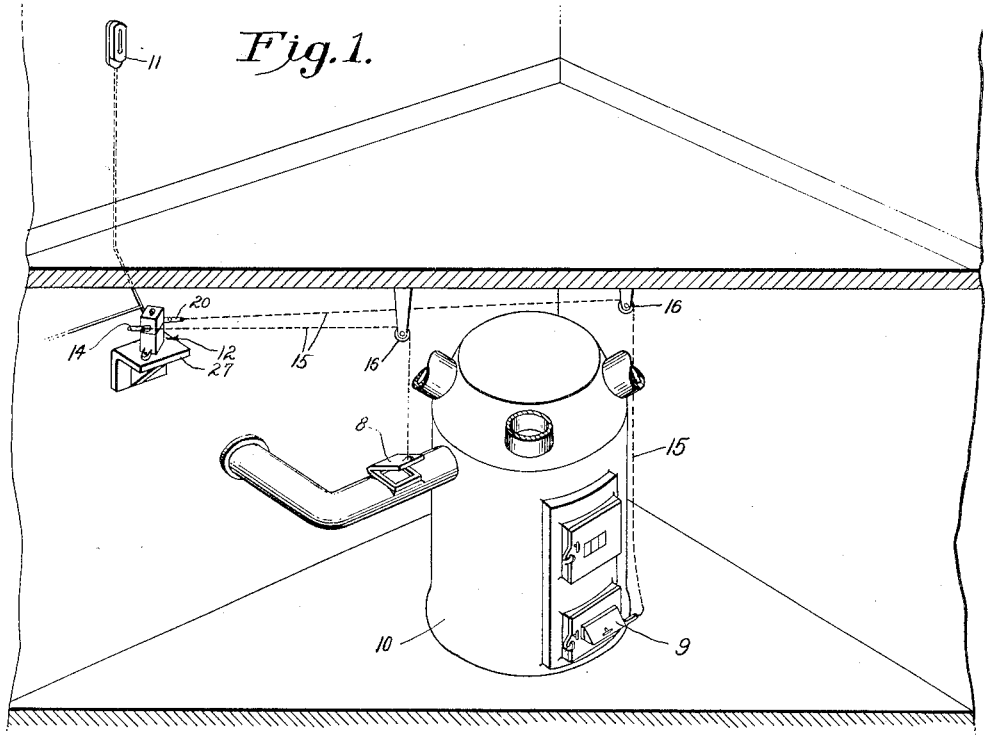
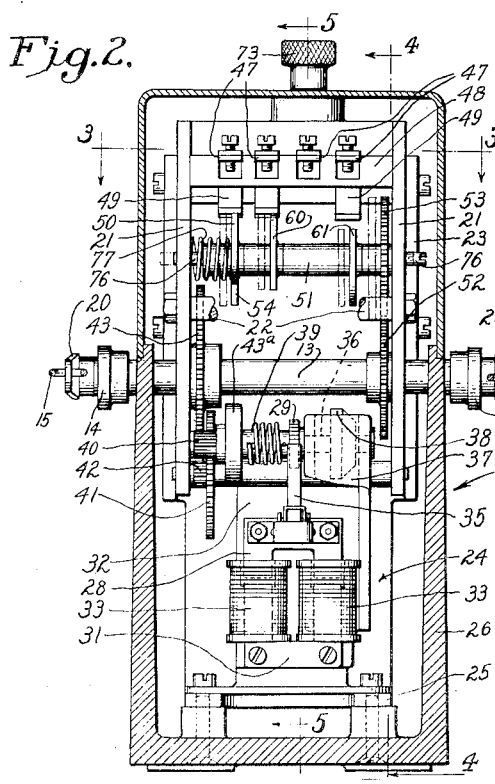
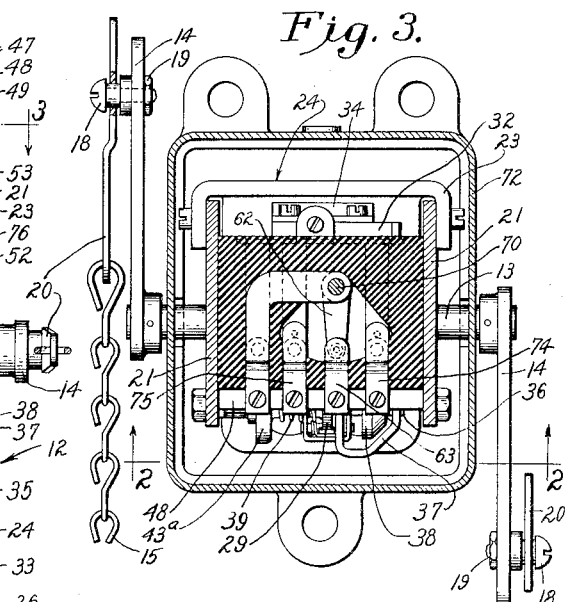
INVENTOR
Duncan J. Stewart
BY
ATTORNEYS June 30, 1931.  D. J. STEWART  1,812,668
HEAT REGULATOR
Filed Jan. 12, 1929  2 Sheets-Sheet 2
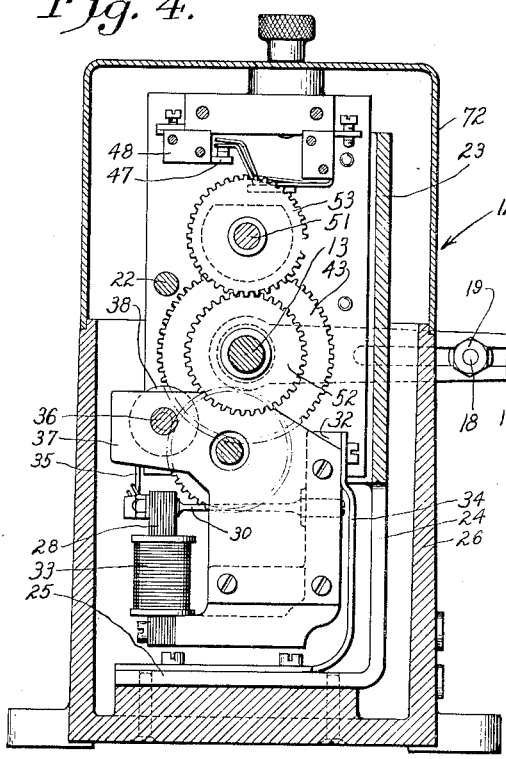
Fig. 4.
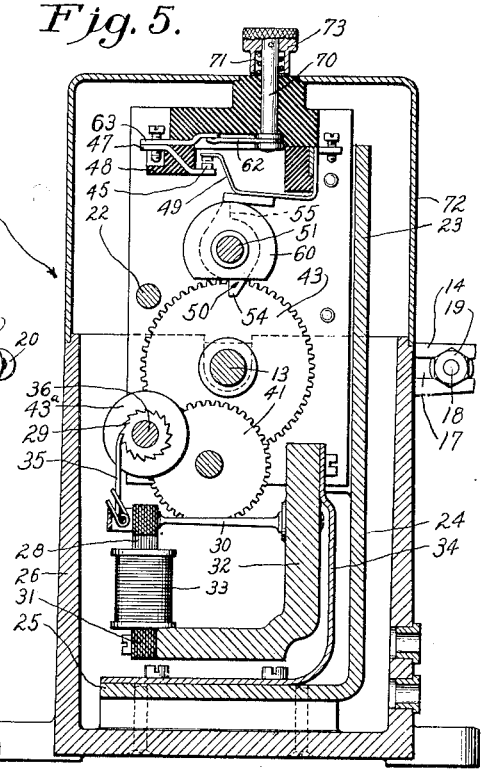
Fig. 5.
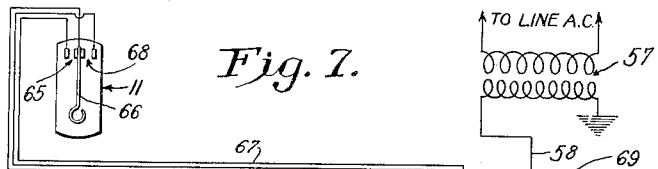
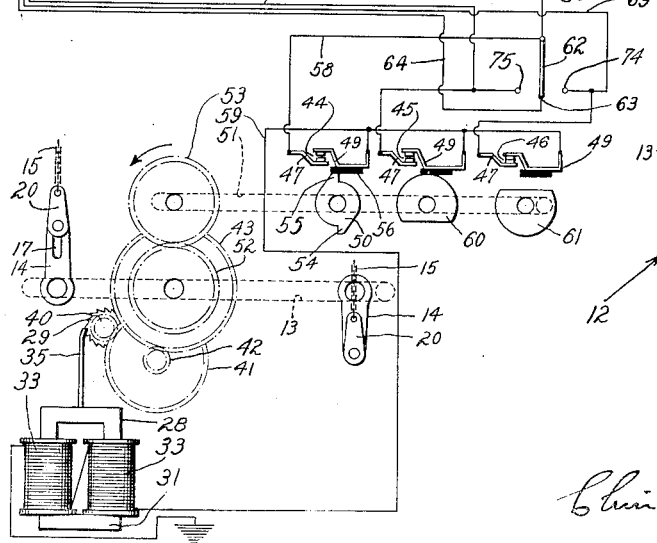
Fig. 7.
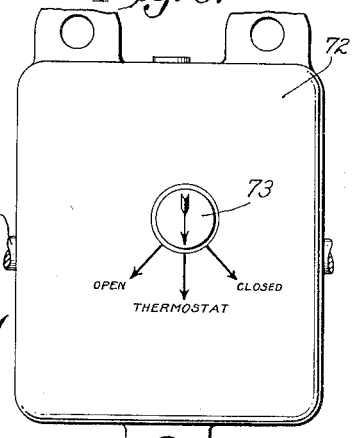
Fig. 6.
INVENTOR
Duncan J. Stewart
BY
ATTORNEYS Patented June 30, 1931

1,812,668

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

HEAT REGULATOR

Application filed January 12, 1929. Serial No. 331,985.

This invention relates to improvements in automatic heat regulators, and more particularly to that class of thermostatically controlled regulators which are used for governing furnace drafts and the like.

One object of the invention is to provide an electrically driven actuating unit for a regulator of the above general character which is inexpensive in construction, simple and reliable in operation, and which can be readily installed.

A further object is to provide a motor unit for actuating furnace draft dampers or other heat regulating devices, the unit having control means for defining the operating cycles thereof, which can be disconnected from the motor proper during the initial adjustment of the motor to the regulating devices, thereby facilitating the installation of the regulator.

Other objects and advantages of the invention will become apparent from the following detailed description taken in connection with the accompanying drawings, in which Figure 1 is a perspective view of a regulator embodying the features of the invention arranged to control an ordinary hot air furnace.

Fig. 2 is a vertical sectional view through the motor unit of the regulator, the section being taken particularly along the line 2—2 of Fig. 3.

Figs. 3, 4 and 5 are sectional views taken respectively along the lines 3—3, 4—4 and 5—5 of Fig. 2.

Fig. 6 is a plan view of the motor unit.

Fig. 7 is a wiring diagram showing the operating parts of the unit in schematic arrangement.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the regulator is arranged to operate the pipe check door 8 and the draft door 9 of a furnace 10 under the control of a thermostat 11 responsive to the temperature of the air in one of the rooms heated by the furnace. The regulator includes a stationary driving unit generally designated by the numeral 12 and having a main shaft 13 which carries oppositely projecting cranks 14 which, by reason of their rigid connection with the shaft, are maintained in a permanently fixed angular relation. The cranks are operatively connected with the check damper 8 and the draft door 9 by means of chains 15 or other suitable cords led around guide pulleys 16.

To provide the desired degree of adjustability in the chain connections, the cranks are formed with longitudinal slots 17 in which shouldered studs 18 are clamped by nuts 19. The studs carry plates 20 each attached to one of the chains. With this arrangement, rotation of the shaft 13 through successive half-revolutions will cause the check door 8 to be alternately opened and closed and the draft door 9 to be closed and opened in corresponding cycles.

The main shaft 13 is journaled near its ends in a frame comprising two plates 21 connected and held rigidly in spaced relation by a shouldered tie rod 22 and by the upper U-shaped portion 23 of a bracket 24. The latter projects below the plates and has a foot 25 (Fig. 4) secured against the bottom of an enclosing casing 26 which is bolted to a suitable support 27 (Fig. 1) located in any convenient place near the furnace.

The electric motor for driving the shaft 13 is located beneath the shaft and in the present instance is of a vibratory type comprising an electromagnet adapted when connected to a source of alternating current to cause vibration of a weighted armature 28 which imparts advancing blows to successive teeth of a small ratchet wheel 29. The armature is of laminated construction and is securely fastened to the free ends of two spring supports 30 anchored in the upright leg of a rigid L-shaped member 32. The springs are constructed with the weight of the armature in view so that the armature and its supports have a natural period of vibration corresponding approximately to the frequency of an alternating current by which the motor is to be energized, this being ordinarily 60 cycles. Preferably the magnet is of the horseshoe type having a core 31 secured to the horizontal leg of the member 32 and carrying two coils 33 into which lugs on the armature project.

Such a motor is particularly advantageous for use in the present environment because it is capable of starting and stopping instantaneously and without the aid of a brake; because it does not draw a high current through the thermostat contacts upon starting; because the switching means required for its control is simple and has a long service life; and because it utilizes alternating current thereby avoiding the use of interrupter switches which have prevented the practical use of vibratory motors for furnace regulation.

To minimize noise and wear and tear incident to the operation of a motor of this type, the member 32 carrying the vibrating parts is resiliently supported, an L-shaped bracket 34 of relatively thin sheet aluminum being employed for this purpose. The horizontal leg of a bracket is secured against the foot 25 and the upper end is fastened to the upstanding leg of the member 32.

Intermediate its ends the armature carries a pawl 35 urged by a spring against the teeth of the ratchet wheel 29. The latter is fast on a shaft 36 journaled at spaced points in the U-shaped end of a bracket 37 which is rigidly secured to the upright leg of the member 32. The inertia of a small fly wheel 38 fast on the shaft 36 serves to prevent reverse rotation thereof.

Rotary motion of the shaft 36 is transmitted to the main shaft 13 through the medium of a flexible coupling in the form of a coiled torsion spring 39, having one end secured to a jack shaft supported by the adjacent frame plate 21 and carrying a pinion 40 meshing with a gear 41 on a shaft having a pinion 42 meshing with a gear 43 on the main shaft. With this arrangement the desired degree of speed reduction is effected. The inertia of a fly wheel 43ª on the jack shaft together with the spring tends to prevent the transmission of mechanical vibration to the gear train.

To control the application of alternating current to the magnet coils so as to cause the motor to rotate the shaft 13 through successive half-revolutions, a control mechanism operating in time relation to said shaft is provided on the side of the shaft opposite the motor unit. This mechanism includes a switch 44 governing a main or running circuit which defines the length of each cycle, and two switches 45 and 46 controlling the starting of the motor in alternate cycles. Each of these three switches comprises a contact on a stationary member 47 (Fig. 5) mounted in an insulating block 48 between the upper ends of the frame plates, and a movable contact on a spring arm 49 secured to the block 48 and normally tending to close the switch.

The switch 44 is controlled by a cam 50 on a shaft 51 journaled at opposite ends in the frame plates 21 and driven from and at the same speed as the shaft 13 through the medium of intermeshing gears 52 and 53 (Fig. 4). The cam 50 has two lobes 54 and 55 adapted to engage an insulating pad 56 on the switch arm 49 and open the switch 44 as shown in Fig. 5, thereby terminating the operating cycle of the motor. The abrupt trailing surfaces of the two lobes allow the switch to close shortly after each cycle has been initiated whereupon an uninterrupted connection between the motor magnet and the source of alternating current is maintained for the remainder of the cycle.

This main or running circuit is energized from the secondary of a step-down transformer 57 whose primary is connected to the alternating current supply. The circuit extends from the non-grounded side of the transformer secondary through a conductor 58, the switch 44, a conductor 59 to one terminal of the electromagnetic coils 33, the other terminal being grounded to the motor frame.

A cam 60 is positioned on the shaft 51 to engage the spring arm of the switch 45 and hold the switch open while the lobe 55 of the cam 50 is effective and to allow the switch 45 to close at the end of the cycle terminated by the lobe 54. A similar cam 61 controls the switch 46 to allow this switch to close at the end of the cycle which is terminated by the lobe 55.

The starting circuit controlled by the cam 60 extends through the secondary, the conductor 58, a manually movable switch arm 62 (Fig. 5), a contact 63 engaged thereby, a conductor 64, a switch 65 operated by the element 66 of the thermostat 11, a conductor 67, the switch 45, the conductor 59 and the electromagnet. A similar circuit is provided through the switch 46 and a thermostat switch 68 which are connected by a conductor 69.

With the arrangement above described it will be seen that when the thermostat element, in response to an increase in the room temperature, closes one of its switches, for example the switch 68, the starting circuit through the then closed switch 46 will be established to apply current to the electromagnet. As the shaft 51 advances, the switch 44 will be allowed to close and the switch 45 will close while the switch 46 will be opened, the cycle being terminated by the opening of the switch 44. Thus the draft door is allowed to close and the check door is opened, thereby checking the furnace fire. When the temperature of the heated rooms decreases below the point predetermined by the setting of the thermostat, the other switch 65 is closed which completes the previously prepared starting circuit through the switch 45, thereby initiating another cycle of the motor in which the draft door 9 is opened and the door 8 is allowed to close.

The arm 62 (Figs. 5 and 7) is connected to the conductor 58 and constitutes the movable element of three manually operable switches, one of which may be opened to render the thermostat inoperative during firing of the furnace. At the same time, a second switch may be closed to cause the draft door 9 to be opened and the check door 8 to be closed. The third switch may be closed to render the thermostat inoperative with the dampers in checked position.

In the present instance, the arm 62 is rigid with a vertical shaft 70 (Fig. 5) journaled in the block 48 and drawn upwardly by the spring 71. Externally of a cover 72 mounted on the casing 26 the shaft 70 carries a knob 73 which may be turned so that an arrow thereon indicates any one of three positions marked "Open", "Closed" or "Thermostat" (Fig. 6). When the knob is in the "Thermostat" position, the arm 62 engages the contact 63 (Figs. 3 and 7) which places the two starting circuits under the control of the thermostat. In the "Closed" position, the arm 62 engages a contact 74 common to the stationary contact of the switch 46 which shunts the thermostat switch 68 out of the starting circuit, thereby causing the motor to close the draft door and open the check door in case the reverse condition prevails at the time. In case the draft door is already closed, turning the knob 73 to the "Closed" position merely renders the thermostat inoperative. A contact 75 common to the switch 45 is engaged by the arm 62 when moved to "Open" position, thereby rendering the thermostat inoperative and causing the motor to execute a cycle to open the furnace drafts.

The shafts 13 and 51 are adapted to be disconnected from each other so that the position of the driving shaft relative to the "Open" and "Closed" positions of the control shaft may be altered as desired in the installation of the regulator. In the present instance, this is accomplished by mounting the shaft 51 on elongated end trunnions 76 spaced to allow for limited endwise movement of the shaft 51 by which the gear 53 may be thrown out of mesh with respect to the gear 52 as indicated in dotted outline in Fig. 2. The switch arms 49 are of sufficient width to remain engaged by their cams throughout the range of axial movement of the control shaft. A coiled spring 77 acting in compression between the cam 50 and the adjacent frame plate normally urges the gear 53 into mesh with the gear 52.

In the actual installation of the regulator, the chains 15 are cut of the desired length and connected to their respective dampers without regard to the position of the cam shaft 51, the main shaft 13 having been turned into the desired angular position before attachment of the chains to the crank arms thereon. The chains are adjusted along the crank arms to give the proper degree of opening for the check damper 8 and the draft door 9 when the shaft is in its two positions and to allow the damper and the door to close tightly in alternate cycles.

Then the control shaft 51 is brought into proper relation with respect to the open and closed positions of the draft door as determined by the angular position of the cranks. To accomplish this, the control shaft is first moved into either its draft "Open" or draft "Closed" position by operating the control knob 73. While the shaft remains in this position, pressure is applied to the end trunnion of the shaft 51 to move the gear 53 out of mesh with the gear 52. With the shafts 13 and 51 thus disconnected, the cranks 14 are turned into their draft "Open" or "Closed" position depending on the position of the shaft 51 which will be indicated by the arrow on the knob 73. Then the gear 53 is allowed to slide into mesh with the gear 52 thereby reestablishing the connection with the shafts 13 and 51 in such relation that the successive half revolutions defined by the shaft 51 will alternately open and close the draft door.

No claim is made herein to the motor per se nor to the manner in which the motor, the mechanism actuated thereby, and the switches are arranged within the supporting frame structure.

I claim as my invention:

1. A furnace regulator having, in combination, an electric motor, a driving shaft arranged to be rotated thereby to operate the draft damper of a furnace, a control shaft, switching means controlled thereby and operable to determine the length of the operating cycles executed by the motor, a thermostat, a pair of switches governed in the rotation of said control shaft and cooperating with said thermostat to control separate starting circuits for said motor, manually operable means by which either of said circuits may be established independent of said thermostat, and means providing a normal driving connection between said driving and control shafts but permitting disconnection of the shafts for varying the operative relation therebetween.

2. A furnace regulator having, in combination, an electric motor, a driving shaft driven thereby and arranged to be connected to the draft control damper of a furnace, a control shaft driven by said motor in timed relation to said first mentioned shaft and arranged to be disconnected from said first shaft to permit of independent relative movement between the shafts, a thermostat, and switching means operable in the rotation of said second shaft and cooperating with said thermostat to govern the supply of electric current to said motor.

3. A furnace regulator combining a power actuator arranged for connection with a regulating device of the furnace to be controlled, control means for said actuator adapted to be operated in each cycle of operation thereof including a shaft having a disengageable gear connection with said actuator, spring means normally holding the gears of said connection in mesh, and a thermostat cooperating with said control means to initiate the operating cycles of said actuator.

4. A power operator for actuating the draft and check dampers of a furnace in response to a thermostat comprising, in combination, an electric motor, a shaft driven by said motor, a pair of rigidly connected crank arms on said shaft connected respectively to said draft and check dampers, switching means cooperating with said thermostat to define successive cyclic movements of said shaft during which said draft damper is alternately opened and closed and said check damper is alternately closed and opened, and an auxiliary control shaft governing the operation of said switching means and arranged to be driven from said motor in timed relation to said drive shaft but adapted to be disconnected from the latter to permit independent relative movement between the shafts whereby to vary the stopping positions of said cranks while maintaining them in fixed angular relation with respect to each other.

5. A power operator for actuating the draft and check dampers of a furnace in response to a thermostat comprising, in combination, an electric motor, a pair of arms rotatably mounted in permanently fixed angular relationship and connected respectively to said draft and check dampers so as to open one damper and close the other upon successive half revolutions of said arms, switching means cooperating with said thermostat and controlling said motor to define half revolutions of said arm, said switching means including a rotary actuator, and means for driving said actuator in timed relation to said arms but arranged to permit the arms to be moved in unison independently of the actuator to permit their angular position relative to the actuator to be varied in the installation of the operator.

In testimony whereof, I have hereunto affixed my signature.

DUNCAN J. STEWART.